United States Patent
Bhogal et al.

(10) Patent No.: US 9,495,869 B2
(45) Date of Patent: Nov. 15, 2016

(54) ASSISTANCE TO LAW ENFORCEMENT THROUGH AMBIENT VIGILANCE

(71) Applicant: International Business Machines Corporation, Armonk, NY (US)

(72) Inventors: Kulvir S. Bhogal, Forth Worth, TX (US); Gregory J. Boss, Saginaw, MI (US); Rick A. Hamilton, II, Charlottesville, VA (US); Brian M. O'Connell, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 106 days.

(21) Appl. No.: 14/505,902

(22) Filed: Oct. 3, 2014

(65) Prior Publication Data

US 2016/0098925 A1 Apr. 7, 2016

(51) Int. Cl.
*G08G 1/017* (2006.01)
*G08G 1/00* (2006.01)

(52) U.S. Cl.
CPC ............ *G08G 1/0175* (2013.01); *G08G 1/017* (2013.01); *G08G 1/205* (2013.01); *G06K 2209/15* (2013.01)

(58) Field of Classification Search
CPC .... G08G 1/017; G08G 1/0175; G08G 1/205; G06K 2209/15
See application file for complete search history.

(56) References Cited

U.S. PATENT DOCUMENTS

| | | | |
|---|---|---|---|
| 6,433,706 B1 | 8/2002 | Anderson, III et al. | |
| 6,982,654 B2 | 1/2006 | Rau et al. | |
| 7,046,169 B2 | 5/2006 | Bucholz et al. | |
| 7,339,495 B2 | 3/2008 | Kavner | |
| 7,412,078 B2 * | 8/2008 | Kim | G08G 1/054 382/105 |
| 8,447,112 B2 | 5/2013 | Paul et al. | |
| 2005/0073436 A1 | 4/2005 | Negreiro | |
| 2011/0148712 A1 * | 6/2011 | DeCabooter | B60R 25/1025 342/457 |
| 2013/0093886 A1 | 4/2013 | Rothschild | |
| 2013/0257631 A1 | 10/2013 | Rangarajan et al. | |
| 2014/0201064 A1 * | 7/2014 | Jackson | G08G 1/0175 705/38 |
| 2015/0124099 A1 * | 5/2015 | Evanitsky | G06K 9/00785 348/149 |

FOREIGN PATENT DOCUMENTS

| | | |
|---|---|---|
| EP | 0656601 A2 | 6/1995 |
| WO | 2013082725 A1 | 6/2013 |

OTHER PUBLICATIONS

"(PRN) CoVi Technologies Announces First Comprehensive High-Definition Vehicle Surveillance System", http://www.chron.com/default/article/PRN-CoVi-Technologies-Announces-First-1801639.php; PRNewswire, May 2007.

"iOnRoad Augmented Driving Pro", https://play.google.com/store/apps/details?id=com.picitup.iOnRoad.pro; at least as early as 2011.

* cited by examiner

*Primary Examiner* — Andrew Bee

(74) *Attorney, Agent, or Firm* — Brown & Michaels, PC; John R. Pivnichny

(57) ABSTRACT

A method, system and computer program product of using cameras in a plurality of vehicles within a geographic area to aid in identifying a location of a vehicle of interest for authorities.

20 Claims, 4 Drawing Sheets

101

ASSISTANCE TO LAW ENFORCEMENT THROUGH AMBIENT VIGILANCE

BACKGROUND

The present invention relates to providing assistance in identifying vehicles of interest to law enforcement, and more specifically to identifying vehicles of interest to law enforcement through the use of other vehicles within a geographic region of the vehicle of interest.

Many occasions exist when law enforcement or governmental authorities seek the assistance of motorists in locating other vehicles. One of the most well-known situations in which the assistance of motorists is sought is "Amber Alerts", standing for America's Missing: Emergency Response. Once law enforcement determines that a child has been abducted, they notify broadcasters and state transportation officials. Amber Alerts interrupt regular programming and are broadcast on radio and television, as well as on highway signs. The alerts can also be issued on lottery tickets, to wireless devices, and over the Internet. Amber Alerts seek assistance from motorists and direct the motorists to watch for certain vehicles with identifiable license plates or other features. Other occasions in which citizens are requested to assist the authorities also exist related to missing persons and/or criminal activity. Currently, this is a manually intensive task, where people of an area are notified by electronic billboards, television news shows, and other media. People are then directed to call the authorities if they spot the vehicle with the identified characteristics.

SUMMARY

According to one embodiment of the present invention, a method of using cameras in a plurality of vehicles within a geographic area to aid in identifying a location of a vehicle of interest for authorities is disclosed. The method comprising the steps of: a computer receiving an alert to search for a vehicle of interest and a location from the authorities; the computer sending a notification of the vehicle of interest to vehicles within a radius of the location; the computer receiving a vehicle of interest recognition from one of the plurality of vehicles indicating that the vehicle of interest had appeared in the camera in the vehicle; and the computer sending at least a location and a time of the vehicle of interest recognition to the authorities.

According to another embodiment of the present invention, a computer program product for using cameras in a plurality of vehicles within a geographic area to aid in identifying a location of a vehicle of interest for authorities comprising a computer comprising at least one processor, one or more memories, one or more computer readable storage media, the computer program product comprising a computer readable storage medium having program instructions embodied therewith. The program instructions being executable by the computer to perform a method comprising: receiving, by the computer, an alert to search for a vehicle of interest and a location from the authorities; sending, by the computer, a notification of the vehicle of interest to vehicles within a radius of the location; receiving, by the computer, a vehicle of interest recognition from one of the plurality of vehicles indicating that the vehicle of interest had appeared in the camera in the vehicle; and sending, by the computer, at least a location and a time of the vehicle of interest recognition to the authorities.

According to another embodiment of the present invention, a computer system for using cameras in a plurality of vehicles within a geographic area to aid in identifying a location of a vehicle of interest for authorities comprising a computer comprising at least one processor, one or more memories, one or more computer readable storage media having program instructions executable by the computer to perform the program instructions. The program instructions comprising: receiving, by the computer, an alert to search for a vehicle of interest and a location from the authorities; sending, by the computer, a notification of the vehicle of interest to vehicles within a radius of the location; receiving, by the computer, a vehicle of interest recognition from one of the plurality of vehicles indicating that the vehicle of interest had appeared in the camera in the vehicle; and sending, by the computer, at least a location and a time of the vehicle of interest recognition to the authorities.

DETAILED DESCRIPTION

In an illustrative embodiment, it is recognized that the method described below is not just limited to vehicle mounted cameras, but may also be implemented through mobile cameras, such as wearable computational devices.

In another illustrative embodiment, it is recognized that existing vehicular cameras may be used to scan for license plates during alerts from law enforcement or government authorities. It is also recognized that cameras are increasingly being placed elsewhere on vehicles, other than just for rear vision, and these other cameras may also be used to identify vehicles of interest. It is also recognized that a computer system associated with a vehicle may determine whether a possible match of a vehicle of interest has been made, and if so, the computer system of the vehicle may automatically report a possible match, along with location information, to authorities. In some implementations, the system may identify vehicles of interest through the license plate number, and/or by the make/model and color of a vehicle.

In another illustrative embodiment, it is recognized that through the involvement of multiple vehicles already present on the roads, ubiquitous processors and bandwidth can be employed in locating endangered persons and/or suspects in criminal activity, saving lives and improving societal conditions.

In an illustrative embodiment, it is recognized that the identity of the user who identifies a vehicle of interest will not be disclosed to the vehicle of interest, and the information will not be used to intrude on the identifier's privacy.

Figure 1:
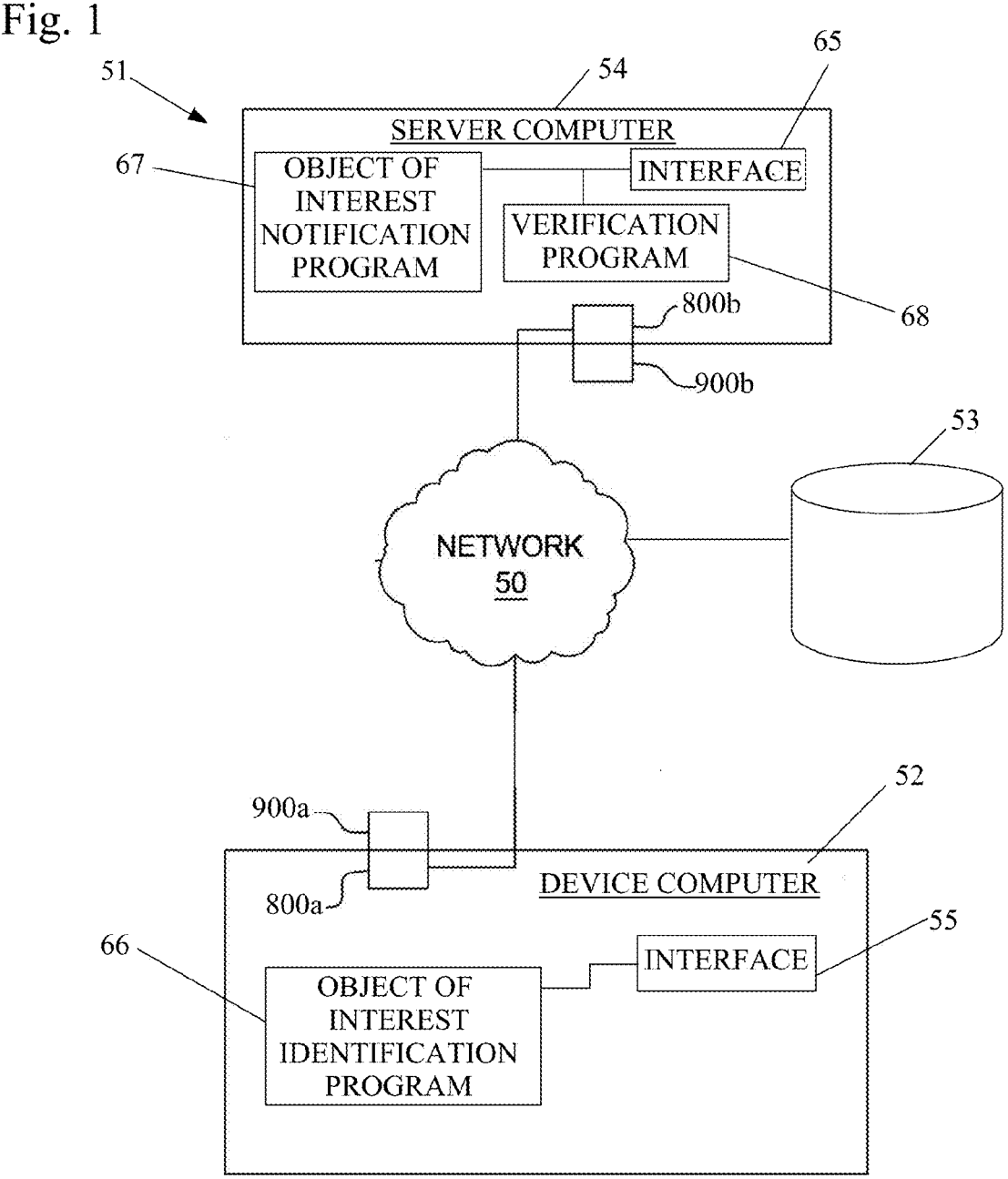
FIG. 1 depicts an exemplary diagram of a possible data processing environment in which illustrative embodiments may be implemented.

FIG. 1 is an exemplary diagram of a possible data processing environment provided in which illustrative embodiments may be implemented. It should be appreciated that FIG. 1 is only exemplary and is not intended to assert or imply any limitation with regard to the environments in which different embodiments may be implemented. Many modifications to the depicted environments may be made.

Referring to FIG. 1, network data processing system 51 is a network of computers in which illustrative embodiments may be implemented. Network data processing system 51 contains network 50, which is the medium used to provide communication links between various devices and computers connected together within network data processing system 51. Network 50 may include connections, such as wire, wireless communication links, or fiber optic cables.

In the depicted example, device computer 52, a repository 53, and a server computer 54 connect to network 50. In other exemplary embodiments, network data processing system 51 may include additional client or device computers, storage devices or repositories, server computers, and other devices not shown.

Device computer 52 may be, for example, a mobile device, a cell phone, a personal digital assistant, a netbook, a laptop computer, a tablet computer, a desktop computer, personal imaging device, a global positioning system (GPS) device, vehicular computer or any other type of computing device.

Device computer 52 may contain an interface 55. The interface 55 may accept commands and data entry from a user. The interface 55 can be, for example, a command line interface, a graphical user interface (GUI), or a web user interface (WUI) or alternatively on server computer 54. The device computer 52 preferably includes an object of interest identification program 66. While not shown, it may be desirable to have the object of interest identification program 66 be present on the server computer 54. Device computer 52 includes a set of internal components 800a and a set of external components 900a, further illustrated in FIG. 4.

Figure 4:
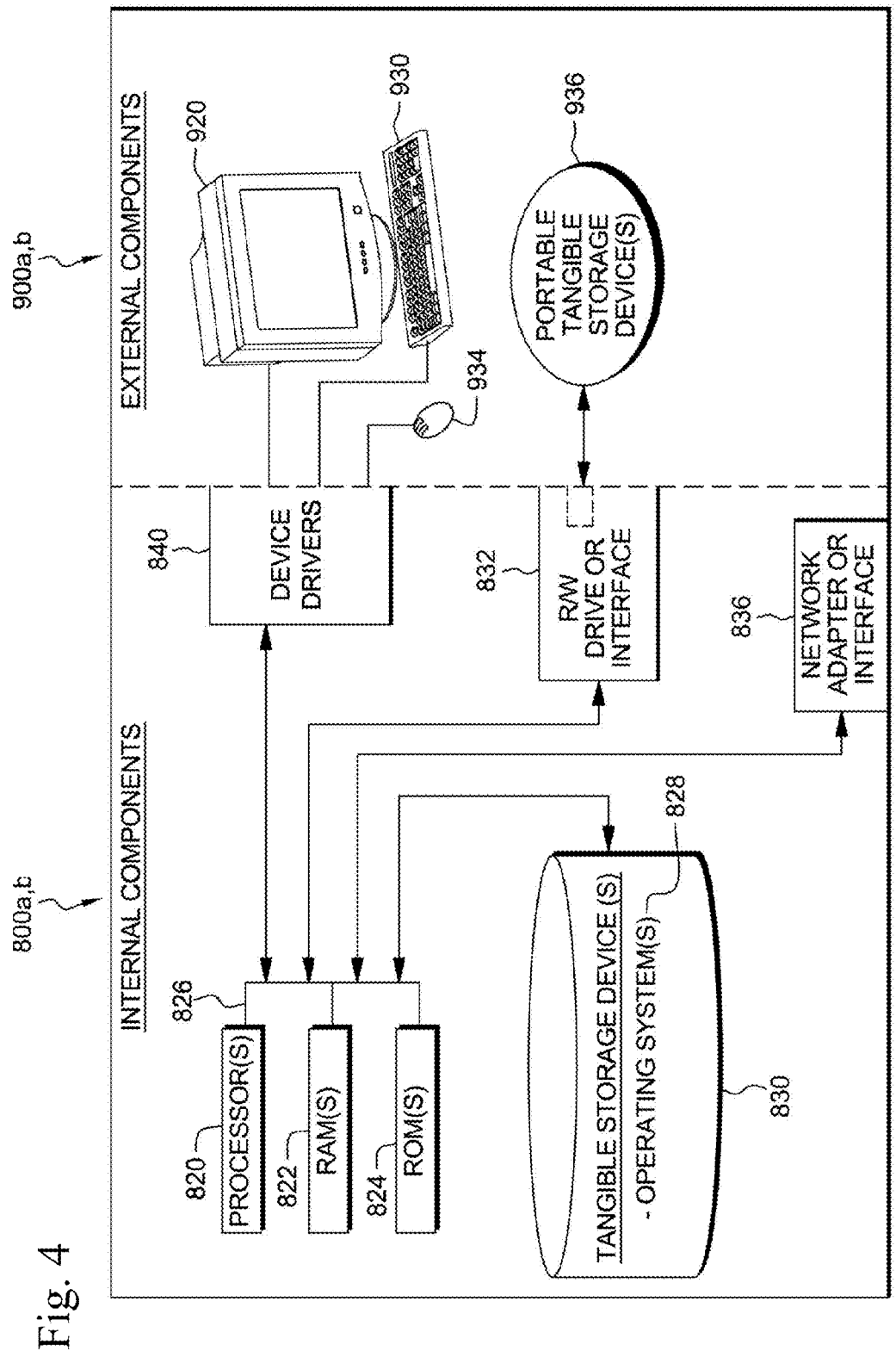
FIG. 4 illustrates internal and external components of a client or device computer and a server computer in which illustrative embodiments may be implemented.

Server computer 54 includes a set of internal components 800b and a set of external components 900b illustrated in FIG. 4. The server computer 54 may contain an interface 65. The interface 65 may accept commands, data entry, and a targeted area or predefined geographic radius of a region. The interface 65 can be, for example, a command line interface, a graphical user interface (GUI), or a web user interface (WUI). The server computer 54 also preferably includes an object of interest notification program 67 and a verification program 68.

In the depicted example, server computer 54 provides information, such as boot files, operating system images, and applications to device computer 52. Server computer 54 can compute the information locally or extract the information from other computers on network 50.

Program code and programs such as an object of interest notification program 67, a verification program 68, and an object of interest identification program 66 may be stored on at least one of one or more computer-readable tangible storage devices 830 shown in FIG. 4, on at least one of one or more portable computer-readable tangible storage devices 936 as shown in FIG. 4, on repository 53 connected to network 50, or downloaded to a data processing system or other device for use. For example, program code and programs such as an object of interest notification program 67, a verification program 68, and an object of interest identification program 66 may be stored on at least one of one or more tangible storage devices 830 on server computer 54 and downloaded to the device computer 52. Alternatively, server computer 54 can be a web server, and the program code and programs such as an object of interest notification program 67, a verification program 68, and an object of interest identification program 66 may be stored on at least one of the one or more tangible storage devices 830 on server computer 54 and accessed on the device computer 52. Object of interest notification program 67, a verification program 68, and an object of interest identification program 66 can be accessed on device computer 52 through interface 55. In other exemplary embodiments, the program code and programs such as an object of interest notification program 67, a verification program 68, and an object of interest identification program 66 may be stored on at least one of one or more computer-readable tangible storage devices 830 on server computer 54 or distributed between two or more servers.

Figure 3:
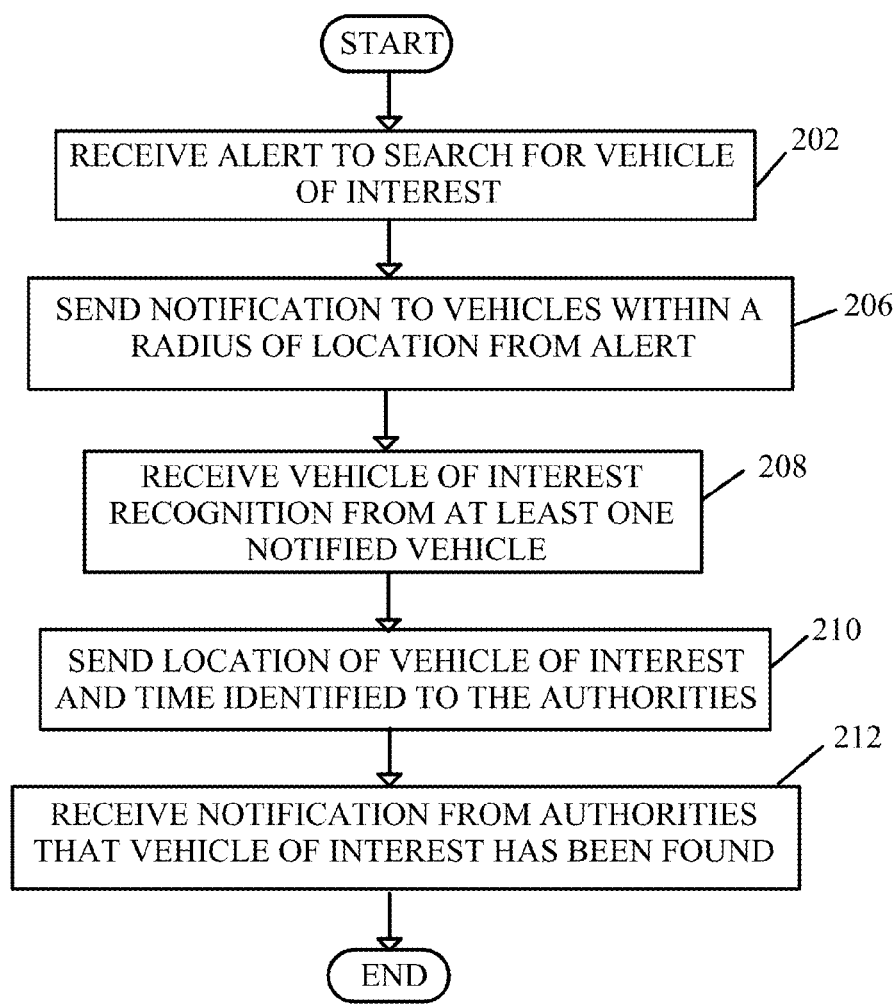
FIG. 3 shows a flow diagram of a method of using vehicle cameras within a geographic area to aid in identifying a location of a vehicle of interest.

FIG. 3 shows a flow diagram of a method of using vehicle cameras within a geographic area to aid in identifying a location of a vehicle of interest.

A computer, for example server computer 54, receives an alert from the authorities to search for a vehicle of interest (step 202), for example through an object of interest notification program 67. The alerts or notification would preferably include information such as license plate numbers, and optionally may include vehicle details and at least a general location within which the vehicle of interest might be found. Other details may also be included.

The computer then sends a notification to vehicles within an area, for example a predefined radius of the general location from the alert (step 206), for example through the object of interest notification program 67. Multiple methods exist for a user and/or vehicle to receive alerts wirelessly. These include, in no particular order, global positioning system receiver; use of existing cellular connections within vehicles, already utilized by services such as General Motors' OnStar® or Daimler-Benz's Mbrace® or Tele Aid; use of mobile handheld devices (e.g., cellphones) to capture information, which is then passed through near-field protocols (e.g., Bluetooth) to the vehicle; use of near-field protocols to broadcast from points alongside the roadway to vehicles as they pass by, wireless data device receiving rich site summary feed. The alerts or notification may be issued via RSS feed, or other subscription techniques, and would typically come with an expiration date/time. The alerts or notification would include information such as license plate numbers, and optionally additional vehicle details.

The computer receives a vehicle of interest recognition from at least one notified vehicle (step 208), for example through the object of interest notification program 67.

In order for the vehicular computer, for example device computer 52, to send the vehicle of interest recognition to the computer, the existing vehicular rear and forward facing cameras are used. For example, an on-board camera, such a rear-facing camera is turned on. The display may or may not be made available to the vehicle's occupants or users, depending on manufacturer and/or user preference. Identification of a license plate is accomplished, for example through the object of interest identification program 66, and once a license plate has been spotted, character recognition is applied to determine whether the contents of the license plate match that sought by authorities and present within the alert. Alternatively, a generic pattern matching of the vehicle's front grille or front/rear bumper could be analyzed to determine the make, model and color of a vehicle without identifying the license plate number, which may be unknown by the authorities. It could also be used in conjunction with the license plate number.

If a match is not present, the vehicular system will return to a "wait state" until another license plate is spotted. If a match is present, this fact, along with geographical information is recorded. It is preferable that the actual scan of the license plate is not stored or transmitted. In different embodiments, the occupants of the vehicle may or may not be informed that such a match has been made, and that they are in the proximity of a fugitive or endangered person.

Alternatively, users of the proposed system could opt-in, based on an alert basis. For example, an Amber Alert occurs and the vehicle of interest is suspected to be within the driver's vicinity, the driver is specifically asked if they would like to assist with the vigilance process of the alert in question.

If the user has "opted in," in some embodiments a positive match might allow the authorities to call the reporting driver, and ask them additional questions.

Through the object of interest identification program 66, the vehicular computer uses wireless means for the match to be returned to the server computer and the authorities. For example, the match may be sent to the computer through the use of existing cellular connections within vehicles, already utilized by services such as General Motors' OnStar® or Daimler-Benz's Mbrace® or Tele Aid, use of mobile handheld devices (e.g., cellphones) to capture information from the vehicle, which is then passed to authorities, and/or use of near-field protocols to broadcast from vehicles to points alongside the roadway.

Information to be shared with authorities includes, but is not limited to the location and time of the identification. Other optional information, e.g., the matching vehicle's owner, direction traveled, or possibly even a photograph of the vehicle from the camera which was used to make the identification may also be transmitted.

In an alternate embodiment, since some states only require license plates in the rear of the vehicle, the information of a "gray Ford Fusion is heading north on I-75" may also be useful and sent to the authorities through the computer so that authorities are dispatched in the area to investigate.

While the above described methods use cameras permanently affixed to the vehicle, the proposed invention may use mobile devices as well. For example, it is known to use a phone to augment driving experience and provide additional safety. Such an application may be modified to support scanning license plates after receiving an alert. This will work well in many states where front license plates are not required.

The computer sends the location and the time of the identification of the vehicle of interest to the authorities (step 210), for example through the object of interest notification program 67.

The computer receives notification from the authorities that vehicle of interest has been found or apprehended (step 212), for example through the verification program 68 and the method ends.

Figure 2:
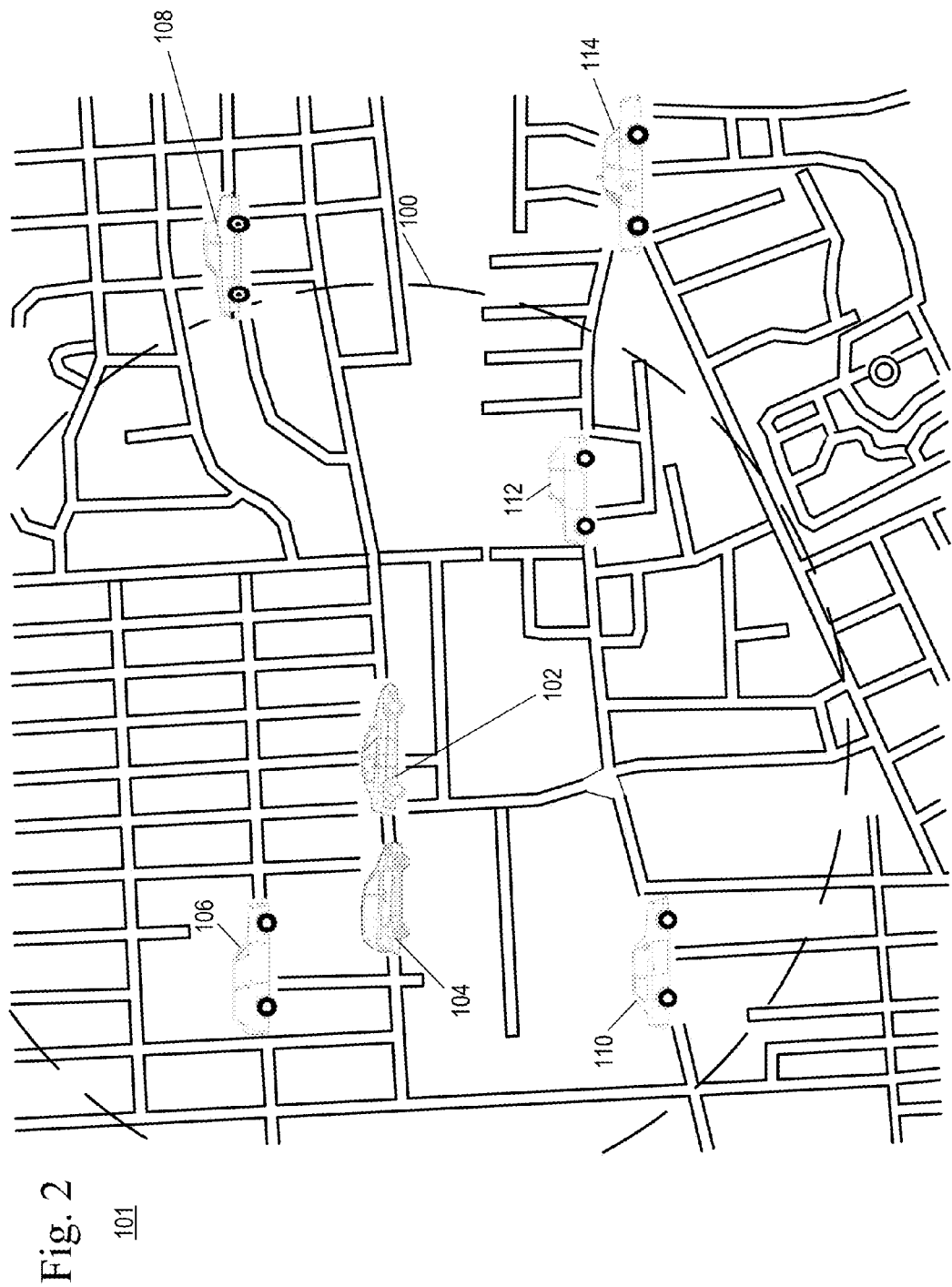
FIG. 2 shows a schematic of a geographic area with a vehicle of interest and other vehicles assisting in locating the vehicle of interest.

FIG. 2 shows an example of the method of using vehicle cameras within a geographic area to aid in identifying a location of a vehicle of interest.

An Amber Alert (or analogous bulletin) is issued by authorities in a given city. Authorities determine that a green vehicle 102, with license plate "421-621" is likely being driven by the perpetrator, and that the vehicle is probably within a certain target area or geographical radius 100 within the city 101. In addition to activating normal media messages (billboards, news stories), vehicles 104, 106, 110, 112 within the target area are notified by wireless means. Vehicle 108 is not notified, as the vehicle is outside of the selected geographic radius. The vehicles' on-board cameras begin to scan for the license plate, optionally correlating it with color and/or vehicle make. If onboard processors of a vehicle (for example van 104) identify the vehicle of interest in the images from the cameras, notification is provided to the authorities via the computer by wireless means, along with position information and time of match. The authorities, in this case, police vehicle 114, is dispatched to the location of the match of the vehicle of interest 102 and will be continually updated as additional matches of the vehicle of interest are provided. Once the vehicle of interest is apprehended, a notification is sent to the computer and the method ends.

FIG. 4 illustrates internal and external components of device computer 52 and server computer 54 in which illustrative embodiments may be implemented. In FIG. 4, device computer 52 and server computer 54 include respective sets of internal components 800a, 800b and external components 900a, 900b. Each of the sets of internal components 800a, 800b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828, an object of interest identification program 66, object of interest notification program 67, and a verification program 68 are stored on one or more of the computer-readable tangible storage devices 830 for execution by one or more of the processors 820 via one or more of the RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, 800b also includes a R/W drive or interface 832 to read from and write to one or more portable computer-readable tangible storage devices 936 such as a CD-ROM, DVD, memory stick, magnetic tape, magnetic disk, optical disk or semiconductor storage device. Object of interest identification program 66, object of interest notification program 67, and verification program 68 can be stored on one or more of the portable computer-readable tangible storage devices 936, read via R/W drive or interface 832 and loaded into hard drive 830.

Each set of internal components 800a, 800b also includes a network adapter or interface 836 such as a TCP/IP adapter card. Object of interest identification program 66, object of interest notification program 67, and verification program 68 can be downloaded to the device computer 52 and server computer 54 from an external computer via a network (for example, the Internet, a local area network or other, wide area network) and network adapter or interface 836. From the network adapter or interface 836, object of interest identification program 66, object of interest notification program 67, and verification program 68 are loaded into hard drive 830. The network may comprise copper wires, optical fibers, wireless transmission, routers, firewalls, switches, gateway computers and/or edge servers.

Each of the sets of external components 900a, 900b includes a computer display monitor 920, a keyboard 930, and a computer mouse 934. Each of the sets of internal components 800a, 800b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Object of interest identification program 66, object of interest notification program 67, and verification program 68 can be written in various programming languages including low-level, high-level, object-oriented or non object-oriented languages. Alternatively, the functions of an object of interest identification program 66, object of interest notification program 67, and a verification program 68 can be implemented in whole or in part by computer circuits and other hardware (not shown).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having thus described the invention of the present application in detail and by reference to embodiments thereof, it will be apparent that modifications and variations are possible without departing from the scope of the invention defined in the appended claims.

What is claimed is:

1. A method of using cameras in a plurality of vehicles belonging to citizens which are not part of law enforcement and governmental authorities within a geographic area to aid in identifying a location of a vehicle of interest for authorities comprising the steps of:
   a computer receiving an alert to search for a vehicle of interest and a location from the authorities;
   the computer sending a notification of the vehicle of interest to a plurality of vehicles within a radius of the location to activate rear-facing cameras of the plurality of vehicles without notifying occupants of the plurality of vehicles;
   the computer receiving a vehicle of interest recognition from one of the plurality of vehicles indicating that the vehicle of interest had appeared in the rear-facing camera in the one of the plurality of vehicles; and
   the computer sending at least a location and a time of the vehicle of interest recognition to the authorities.

2. The method of claim 1, wherein the notification is sent to the plurality of vehicles to be received by a communication device selected from the group consisting of: a global positioning system receiver, a cellular connection inside the vehicle, a handheld communication device, a wireless data device receiving rich site summary feed, and a receiver for near-field protocols.

3. The method of claim 1, wherein the computer further sends a make, model and color of the vehicle of interest to the authorities.

4. The method of claim 1, wherein the vehicle of interest recognition is derived from license plate identification.

5. The method of claim 1, wherein the vehicle of interest recognition is derived from imaging of a grille of the vehicle of interest.

6. The method of claim 1, wherein the vehicle of interest recognition is derived from imaging of a bumper of the vehicle of interest.

7. The method of claim 1, further comprising the step of the computer receiving a notification from the authorities that that the vehicle of interest has been found.

8. A computer program product for using cameras in a plurality of vehicles belonging to citizens which are not part of law enforcement and governmental authorities within a geographic area to aid in identifying a location of a vehicle of interest for authorities comprising a computer comprising at least one processor, one or more memories, one or more computer readable storage media, the computer program product comprising a computer readable storage medium having program instructions embodied therewith, the program instructions executable by the computer to perform a method comprising:
   receiving, by the computer, an alert to search for a vehicle of interest and a location from the authorities;
   sending, by the computer, a notification of the vehicle of interest to a plurality of vehicles within a radius of the location to activate rear-facing cameras of the plurality of vehicles without notifying occupants of the plurality of vehicles;
   receiving, by the computer, a vehicle of interest recognition from one of the plurality of vehicles indicating that the vehicle of interest had appeared in the rear-facing camera in the one of the plurality of vehicles; and
   sending, by the computer, at least a location and a time of the vehicle of interest recognition to the authorities.

9. The computer program product of claim 8, wherein the notification is sent to the plurality of vehicles to be received by a communication device selected from the group consisting of: a global positioning system receiver, a cellular connection inside the vehicle, a handheld communication device, a wireless data device receiving rich site summary feed, and a receiver for near-field protocols.

10. The computer program product of claim 8, wherein the computer further sends a make, model and color of the vehicle of interest to the authorities.

11. The computer program product of claim 8, wherein the vehicle of interest recognition is derived from license plate identification.

12. The computer program product of claim 8, wherein the vehicle of interest recognition is derived from imaging of a grille of the vehicle of interest.

13. The computer program product of claim 8, wherein the vehicle of interest recognition is derived from imaging of a bumper of the vehicle of interest.

14. The computer program product of claim 8, further comprising receiving, by the computer, a notification from the authorities that that the vehicle of interest has been found.

15. A computer system for using cameras in a plurality of vehicles belonging to citizens which are not part of law enforcement and governmental authorities within a geographic area to aid in identifying a location of a vehicle of interest for authorities comprising a computer comprising at least one processor, one or more memories, one or more computer readable storage media having program instructions executable by the computer to perform the program instructions comprising:
   receiving, by the computer, an alert to search for a vehicle of interest and a location from the authorities;
   sending, by the computer, a notification of the vehicle of interest to a plurality of vehicles within a radius of the location to activate rear-facing cameras of the plurality of vehicles without notifying occupants of the plurality of vehicles;
   receiving, by the computer, a vehicle of interest recognition from one of the plurality of vehicles indicating that the vehicle of interest had appeared in the rear-facing camera in the one of the plurality of vehicles; and
   sending, by the computer, at least a location and a time of the vehicle of interest recognition to the authorities.

16. The computer system product of claim 15, wherein the notification is sent to the plurality of vehicles to be received by a communication device selected from the group consisting of: a global positioning system receiver, a cellular connection inside the vehicle, a handheld communication device, a wireless data device receiving rich site summary feed, and a receiver for near-field protocols.

17. The computer system of claim 15, wherein the computer further sends a make, model and color of the vehicle of interest to the authorities.

18. The computer system of claim 15, wherein the vehicle of interest recognition is derived from license plate identification.

19. The computer system of claim 15, wherein the vehicle of interest recognition is derived from imaging of a grille of the vehicle of interest.

20. The computer system of claim 15, further comprising receiving, by the computer, a notification from the authorities that that the vehicle of interest has been found.

\* \* \* \* \*